US007870256B2

(12) United States Patent
Talwar et al.

(10) Patent No.: US 7,870,256 B2
(45) Date of Patent: Jan. 11, 2011

(54) REMOTE DESKTOP PERFORMANCE MODEL FOR ASSIGNING RESOURCES

(75) Inventors: Vanish Talwar, Palo Alto, CA (US); Sujoy Basu, Menlo Park, CA (US); Raj Kumar, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1491 days.

(21) Appl. No.: 11/248,932

(22) Filed: Oct. 12, 2005

(65) Prior Publication Data
US 2006/0218285 A1 Sep. 28, 2006

Related U.S. Application Data

(63) Continuation-in-part of application No. 11/090,714, filed on Mar. 25, 2005, now Pat. No. 7,774,457.

(51) Int. Cl.
*G06F 15/173* (2006.01)
(52) U.S. Cl. .................... 709/226; 709/223; 709/224
(58) Field of Classification Search ............... 709/223, 709/224, 226
See application file for complete search history.

(56) References Cited

U.S. PATENT DOCUMENTS

| 7,643,442 | B1 * | 1/2010 | Calhoun ............ 370/328 |
| 2006/0195547 | A1 * | 8/2006 | Sundarrajan et al. ...... 709/217 |
| 2007/0028068 | A1 * | 2/2007 | Golding et al. ........... 711/170 |
| 2009/0150399 | A1 * | 6/2009 | Patel ................. 707/10 |
| 2009/0307428 | A1 * | 12/2009 | Schmieder et al. ........ 711/118 |

OTHER PUBLICATIONS

"Architecture for Resource Allocation Services supporting Interactive Remote Desktop Sessions in Utility Grids", Middleware 2004 Companion, pp. 23-28, Oct. 2004.*
Basu, S. et al., "Interactive Grid Architecture for Application Service Providers", HP Laboratories Palo Alto, HPL-2003-84, Jul. 2003, ICWS '03, Jun. 2003.
Dwoskin J. et al., "Scoping Security Issues for Interactive Grids", HP Laboratories Palo Alto, HPL-2003-227, Nov. 2003.
Friedrich, M. et al., "Stochastic Resource Prediction and Admission for Interactive Sessions on Multimedia Servers", Proc. of 8th ACM Conf. on Multimedia (ACM-MM) 2000.
Haring, G., "On Stochastic Models of Interactive Workloads", North-Holland Publishing Company, 1983.
Hlavacs, H. et al., "Modeling User Behavior: A Layered Approach", downloaded Oct. 4, 2005.
Kumar, R. et al., "A Resource Management Framework For Interactive Grids", HP Laboratories Palo Alto, HPL-2003-85, Jul. 2003.
Microsoft Windows 2000 Server, "Windows 2000 Terminal Services Capacity and Scaling", Microsoft Corp., Redmond, WA, Copyright 2000.
Nabrzyski, J. et al., "Grid Resource Management, State of the Art and Future Trends", Kluwer Academic Publishers, Sep. 2003, p. 15-23, 135-183.

(Continued)

*Primary Examiner*—Shawki S Ismail

(57) ABSTRACT

A request for a remote desktop session is received. A remote desktop session performance model is generated based on the applications to be used in the remote desktop session, and resources are assigned to the remote desktop session using the remote desktop session performance model.

22 Claims, 9 Drawing Sheets

OTHER PUBLICATIONS

Nieh, J. et al., "Measuring Thin-Client Performance Using Slow-Motion Benchmarking", ACM Transactions on Computer Systems, vol. 21, No. 1, Feb. 2003.

Richardson, T. et al., "Virtual Network Computing", IEEE Internet Computing vol. 2, No. 1, Jan./Feb. 1998.

Rolia, J. et al., "Grids for Enterprise Applications", Workshop on Job Scheduling Strategies for Parallel Processing, Jun. 2003.

Schmidt, B. et al., "The Interactive Performance of SLM: A Stateless, Thin-Client Architecture", 17th ACM Symposium on Operating Systems Principles (SOSP'99), Dec. 1999.

Urgaonkar, B. et al., "Resource Overbooking and Applications Profiling in Shared Hosting Platforms", OSDI 2002.

Wong, A. et al., "Evaluating Windows NT Terminal Server Performance", Proceedings of the 3rd USENIX Windows NT Symposium, Jul. 1999.

Yang, S. et al., "The Performance of Remote Display Mechanisms for Thin-Client Computing", 2002 USENIX Annual Technical Conference, Jun. 2002.

Citrix, http://www.citrix.com/, downloaded Mar. 24, 2005.

HP Process Resource Manager, http://www.hp.com/products1/unix/operating/prm/, downloaded Mar. 24, 2005.

Microsoft Terminal Servers, http://www.microsoft.com/windowsserver2003/technologies/terminalservices/default.mspx, downloaded Mar. 24, 2005.

Real VNC, http://www.realvnc.com/, downloaded Mar. 24, 2005.

\* cited by examiner

REMOTE DESKTOP PERFORMANCE MODEL FOR ASSIGNING RESOURCES

CROSS-REFERENCE TO RELATED APPLICATIONS

This is a continuation-in-part of commonly assigned U.S. patent application Ser. No. 11/090,714, filed Mar. 25, 2005, now U.S. Pat. No. 7,774,457 entitled Resource Allocation For Grid Computing, the disclosure of which is hereby incorporated herein by reference.

BACKGROUND

One fundamental system management task is the allocation of computer resources to applications. Today's information technology systems typically pre-allocate and pre-install servers and storage resources for customer applications. In order to meet predetermined quality of service (QoS) requirements, however, servers are typically over-provisioned and under utilized. In a resource-on-demand environment, such as a single data center or a utility computing environment, a large number of resources are used to meet the computing demands of customers. In these environments, over-provisioning results in substantial expenses for wasted resources.

Over-provisioning may be minimized if computing demands are highly predictable. However, in some instances, predicting computing needs is difficult For example, thin clients are becoming increasingly popular as a way to manage user applications. A thin client is typically connected to one or more servers that run all the user applications remotely in a remote desktop session with the user. However, the computing needs of a remote desktop session are difficult to predict, because a user may run any number of applications in the session at any time. Thus, a system administrator may substantially over-provision resources for a remote desktop session to ensure the user is receiving a predetermined QoS.

SUMMARY

According to an embodiment, a request for a remote desktop session is received. A remote desktop session performance model is generated based on the applications to be used in the remote desktop session, and resources are assigned to the remote desktop session using the remote desktop session performance model.

BRIEF DESCRIPTION OF THE DRAWINGS

Embodiments are illustrated by way of example and not limitation in the accompanying figures in which like numeral references refer to like elements, and wherein.

DETAILED DESCRIPTION OF THE EMBODIMENTS

For simplicity and illustrative purposes, the principles of the embodiments are described. However, one of ordinary skill in the art would readily recognize that the same principles are equally applicable to, and can be implemented with variations that do not depart from the true spirit and scope of the embodiments. Moreover, in the following detailed description, references are made to the accompanying figures, which illustrate specific embodiments.

An interactive session may include any session in which a user interacts with one or more applications hosted by computer resources. A remote desktop session is an interactive session where the computer resources hosting the applications are located remotely from the user. For example, the resources hosting the applications for the remote desktop session are located in a resource-on-demand environment, such as a data center, and a user of the remote desktop session is in a location remote from the data center. Some examples of applications that may be run in a remote desktop session include applications for financial services, CAD/CAM applications, and office applications, such as spreadsheets, word processors, and email applications. The applications are viewed by the remote user, for example, using conventional technology, such as CITRIX, Terminal Server, or virtual network computing (VNC).

According to an embodiment, performance modeling is used to allocate resources for a remote desktop session. For example, the applications to be used in the remote desktop session are determined, and a remote desktop session performance model is generated based on models for the applications. The remote desktop session performance model is used to determine the resources needed to run the remote desktop session, which may include the resources needed to satisfy service level objectives in order to maintain predetermined QoS for the remote desktop session.

Figure 1:
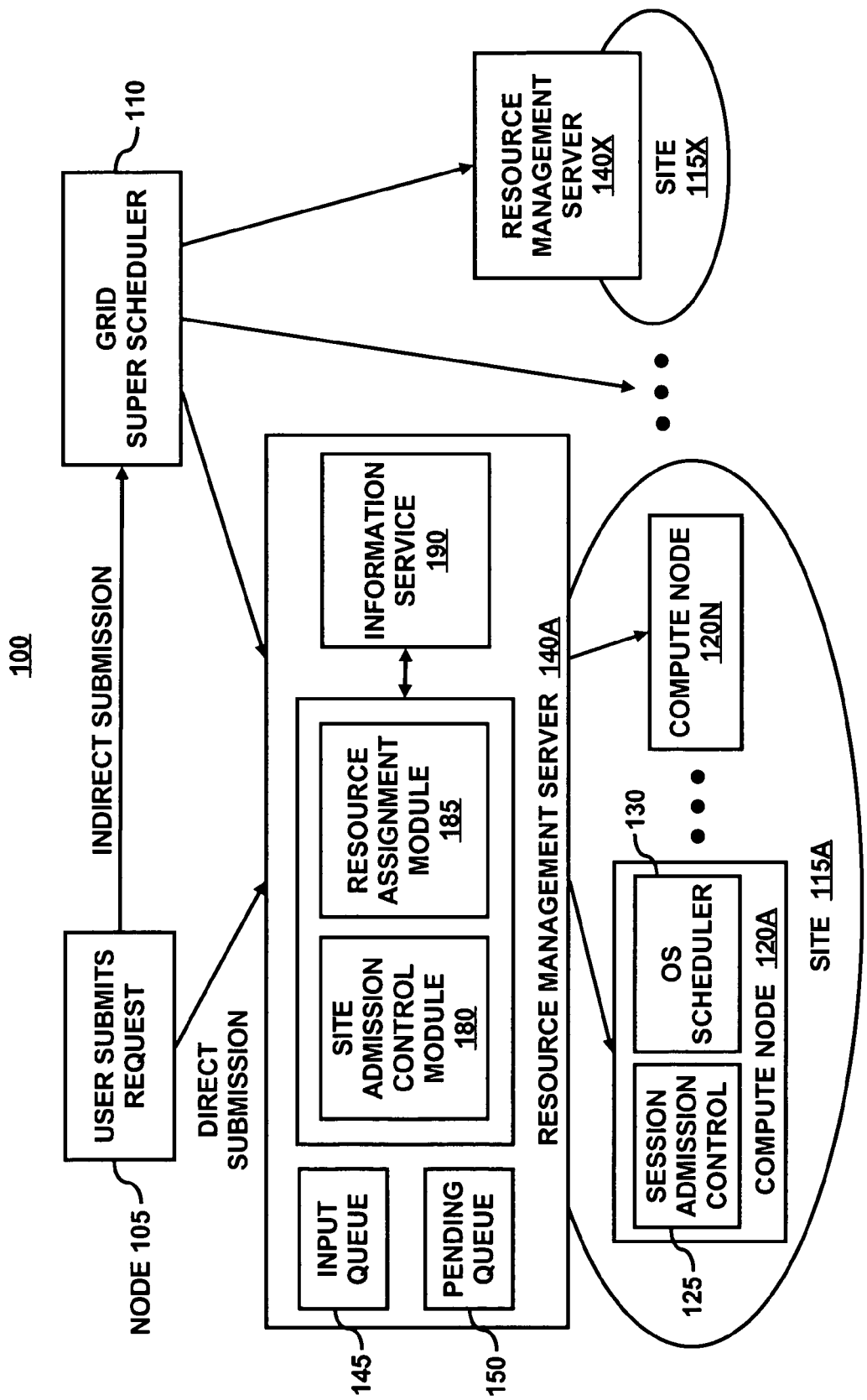
FIG. 1 depicts an operating environment of a grid computing system, according to an embodiment.

The remote desktop sessions may be executed in a grid computing environment, such as described with respect to FIG. 1, which is operable to run batch jobs as well as interactive sessions and may also run enterprise applications. However, remote desktop session performance modeling may be used for any environment operable to allocate resources for a remote desktop session.

Referring to FIG. 1, a diagram of an operating environment of a grid computing system 100 is shown. The grid computing system 100 may include any distribution of computing resources that may be accessed by a user. For example, the system 100 may include a plurality of geographically distributed resources.

The grid computing system 100 may include a plurality of data centers that provide a shared pool of computer resources. The plurality of data centers may include any number of data centers on any scale. In addition, the data centers may be public, private, or a combination of public and private data centers. The shared pool of resources may comprise resources that are distributed across a wide geographic area. The shared pool of resources may also comprise heterogeneous resources from the plurality of data centers. In addition, the resources may be shared by several users, either at different times or simultaneously.

The system 100 includes at least one submission node 105 in which a user submits a request for utilizing grid computing resources. The submission node 105 may comprise a computing device. For example, the computing device may include a thin client operated by a user, any public or private computer terminal connected to a network, or any other known type of computing device. A thin client is software, hardware or combination of hardware and software that serves as a client. In some instances, the thin client may not include a hard disk drive because applications are hosted on a remote server and interacted with through the thin client.

A user may desire interactive access in the form of interactive sessions with one or both of a public or private machine, or one or both of a plurality of public or private machines, each machine having resources accessible within a grid computing environment. For an interactive session, keyboard and mouse events may be submitted by a user from the submission node 105 to one or more compute nodes 120A, 120N, etc., within a grid. A remote display may then be sent from a compute node 120A, for example, to the user's submission node 105.

The grid computing system 100 also includes a plurality of sites 115A-115X. Each site 115A-115X may comprise a data center site operated, for example, by a public or private entity, such as an application service provider or a corporate in-house information technology department. Each of the sites 115A-115X may include a plurality of compute nodes 120A-N. Each compute node 120A-N may provide computer resources for running one or more mixed workloads or applications, for example, during a remote desktop session. For example, a user in a thin client environment may launch one or more applications that require user interaction during a remote desktop session.

According to an embodiment, the system 100 may provide resource allocation for executing one or more mixed workloads, for instance, workloads that provide for simultaneously running one or more batch jobs and interactive sessions in a grid computing environment. The system 100 may include a resource allocation architecture that utilizes the same set of computer resources to concurrently run an interactive session and a batch job. Enterprise applications or a portion of an enterprise application may also be simultaneously executed by the same compute resources.

Batch jobs and interactive sessions may run on any single compute node or on any number of different compute nodes, and in any order of execution, including concurrently executing batch jobs and interactive sessions on the same compute or different compute nodes or sequentially executing batch jobs and interactive sessions. In one example, one or more batch jobs and interactive sessions run concurrently on the same compute node, for instance, the compute node 120A. In another example, one or more batch jobs may run on the compute node 120A while, simultaneously, one or more interactive sessions run on a separate compute node, such as the compute node 120N.

Batch job execution in a grid computing environment may involve any process that is executed by one or more backend services without user interaction, for example one or more remote compute nodes 120A-N. For example, a user may submit a request that is executed as a batch job. When the batch job begins, processing may continue until it is completed, without input or interaction by a user. Once the batch job request is submitted by the user, a compute node, such as the remote compute node 120A, is assigned to execute the batch job. In executing the batch job, the compute node 120A may run an application to execute the batch job without further user input or involvement. For instance, a print job command submitted by a user at submission node 105 may be executed entirely by the remote compute node 120A, without further input by the user. The remote compute node 120A may also communicate with one or more other compute nodes, such as compute node 120N, etc., within the system 100 to execute a batch job.

Resources are also allocated for interactive sessions. The system 100 may utilize a hierarchical session architecture for establishing an interactive session. A hierarchical session architecture may comprise a remote desktop session and one or more per-application interactive sessions. The hierarchical session architecture is further described with respect to FIGS. 2 and 3 where the resource management server 140A handles requests for remote desktop sessions and the session admission control module 125 handles per-application interactive session requests after a session is started.

A global interactive session, which is a remote desktop session, may constitute an association between a user using the submission node 105 and a remote compute node, such as one of the compute nodes 120A-N, wherein the user using the submission node 105 interacts with the remote compute node to launch one or more applications. One example of a remote desktop session is a VNC remote display session wherein the graphical desktop of a remote node, such as the compute node 120A, is exported, for example, to the computer terminal of a user using the submission node 105. A remote desktop session may be established for graphical applications, but may also occur with text-only applications or any other desired interface. The resource allocation architecture of system 100 may allocate grid computing resources for executing at least one desktop session simultaneously with at least one batch job.

After a remote desktop session is established, a user may subsequently interact with the launched applications through one or more per-application sessions. A per-application interactive session for an application executing on a remote compute node, such as the compute node 120A, may include an association between a user and an executing application wherein the user interacts directly with the application. A per-application interactive session may occur in the context of a remote desktop session. A per-application interactive session may include interaction with a graphical application, but may also include interaction with text-only applications or any other desired interface. Application sessions may be established to utilize applications provided by application service providers (ASPs) or by in-house corporate departments, for example. Examples of applications in such environments include CAD/CAM applications, office applications, and financial applications.

The steps for requesting and establishing a remote desktop session are similar for either of the user sending the request to one data center or the user sending the request to a scheduler, such as the grid super scheduler 110 shown in FIG. 1, operable to assign resources from one or more data centers.

With reference to FIG. 1, a user may, from the submission node 105, submit a request either directly or indirectly for establishing a desktop session with one of a plurality of sites 115A-115X. A user may submit a request for establishing a desktop session indirectly using a grid super scheduler 110. The grid super scheduler 110 is capable of scheduling user requests across a plurality of different sites 115A-115X. Alternatively, a user request may be submitted directly to a plurality of sites 115A-115X.

Whether a request for a desktop session is submitted directly or indirectly by a user from the submission node 105, the user's request is received by a resource management server, such as the resource management server 140A, within the data center site 115A. Each of the sites 115A-115X includes, in addition to one or more compute nodes 120A-N, a corresponding resource management server 140A-140X. The resource management server 140A schedules one or more desktop sessions across one or more of a plurality of corresponding compute nodes 120A-N

In addition, each resource management server 140A-140X may include at least one or more of an input queue 145, a pending queue 150, a site admission control module 180, and a resource assignment module 185. Each resource management server 140A-140X may also include at least one information service module 190.

User requests that are received by the resource management server 140A are placed in the corresponding input queue 145. Upon arrival of each user request, coarse grain filtering or any other suitable filtering method may be used in determining which of the plurality of compute nodes 120A-N, to assign to each request. The filtering process allows for optimization of resource allocation based on the computing requirements, also referred to as the computing needs or resource requirements, of each request for a desktop session. For instance, filtering of the plurality of compute nodes 120A-N, within each of the sites 115A-115X may be based on one or more static resource requirements for scheduling each desktop session. The static resource requirements may include, for example, the desired processor speed and type, the desired memory size, etc. In one example, models for each of the resources in the data center are determined, which include the characteristics of each resource. Static resource requirements are matched with the resource models. For example, the static resource requirements are 1 GHZ processor and 1 GB of memory. A determination is made as to whether any of the resource models have the static resource requirements. If not, the request for the desktop session is denied, and notice of the denied request may be sent. If at least one resource model has the static resource requirements, then a remote desktop model may be generated. Other heuristic approaches or methods may also be utilized for determining the resource requirements for each request for a desktop session.

The assignment of each request for a desktop session to one or more compute nodes 120A-N, that satisfy the static resource requirements is performed by a site admission control module, such as the site admission control module 180, within each corresponding resource management server 140A-140X. If none of the compute nodes 120A-N, satisfy the filtering requirements for a desktop session request, then the request is denied as described above because there are no resources that have the required static resource requirements.

If at least one of the plurality of compute nodes 120A-N, is identified as satisfying the static resource requirements, as determined by the course grain filtering, then a remote desktop session performance model is generated, as described in further detail below with respect to FIG. 3, which may depend upon the interplay of multiple applications to be executed in the requested remote desktop session, as well as the execution order of multiple applications.

The site admission control module 180 determines whether any of the resources satisfying the static resource requirements is capable of running the remote desktop session based on the computing requirements for the requested remote desktop session, which are estimated using the remote desk session performance model. If not, the site admission control module 180 places the request in the pending queue 150 from the input queue 145 until a resource is available to run the remote desktop session. If a resource is available to run the desktop session the resource assignment module 185 assigns the resource to the remote desktop session.

In one example, the resource assignment module 185 identifies a compute node, such as one or more of the compute nodes 120A-120N or a portion of a compute node or portions of compute nodes that satisfies the static resource requirements. An example of a portion of a compute node is a portion of the resources for a server, such as a number of CPUs or percentage of a CPU, amount of memory, and bandwidth. Once the identified compute node, such as the compute node 120A, is assigned to a request, deployment infrastructure within the corresponding resource management server 140A may perform configuration steps, for example, a setup of the user's data and any required applications at the identified compute node, such as the compute node 120A.

The site admission control module 180 and the resource assignment module 185 may communicate with one or more information service modules, such as the information service module 190, in determining which compute node or portion of a compute node to assign a request. The information service module 190 may provide information that may be utilized in determining where to assign a user request, including information about the resource capabilities of a particular compute node 120A-N. The information service module 190 for example may be part of a monitoring system for determining real time utilization data 303 shown in FIG. 2.

Once the required configurations are performed, the desktop session may begin, and the user may launch and interact with several applications, which may include several instances of the same application, hosted by the identified compute node 120A. The user may submit one or more requests for per-application interactive sessions directly to the identified compute node 120A through the session admission control module 125. The session admission control module 125 may be implemented in a middleware stack or in another suitable manner. One or more criteria may be employed by the session admission control module 125 to determine if a request for a per-application interactive session can be handled by the compute node 120A at any particular time. If the identified criteria are satisfied for the session admission control test, then the requested application, for example, may be started in the context of the remote desktop session. Criteria for establishing a per-application interactive session may include, for example, estimating computing requirements for a requested application using an application model for the requested application, estimating computing requirements for the desktop session using the desktop session performance model and the computing requirements of currently running applications in the desktop session, if any.

The session admission control module 125 thus evaluates whether to admit a per-application interactive session by an available compute node, such as the compute node 120A. The session admission control module 125 may also enforce QoS guarantees, including service level objectives (SLOs), which may be provided in service-level agreements (SLAs), which may be specified for per-application interactive sessions. The SLAs may also be specific to each type of application.

In addition, within the identified compute node 120A, the operating system scheduler (OS scheduler) 130 schedules per-application sessions for the local processor. For instance, the OS scheduler 130 may be used for scheduling one or more applications to be run by a processor in a computer system. In one example, if the session admission control module 125 determines that an application may be started by the compute node 120A, a request is submitted by the session admission control module 125 to a local OS to start the application. In response to submitting the request, information may be provided by the local OS, including information about application programming interface (API) requirements for different applications. After the local OS processes the request, the local OS transmits the request to the OS scheduler 130 for scheduling the application for execution on the local processor.

An OS scheduler, such as the OS scheduler 130, may operate in a similar manner for each corresponding compute node 120A-120N, within each corresponding site 115A-115X. The OS scheduler 130 may schedule one or more per-application sessions based on the evaluation of resource requirements, including at least one or more of CPU utilization, network bandwidth, storage bandwidth, and network latency requirements.

During each per-application session, resource management monitoring agents may be used to monitor session resource utilization values. The monitored data may be aggregated by aggregator agents. Enforcement agents may use this data to enforce quality of service requirements. In addition, an application predictor system may use the aggregated data to predict application behavior.

Thus, referring to FIG. 1, a distributed resource management framework may be distributed across the submission node 105, the compute nodes 120A-N, and the resource management server 140A within the corresponding site 115A.

The resource management server 140A may also admit batch jobs. For example, the resource management server 140A determines the computing requirements, or the computing needs, for a batch job and selects one or more of the compute nodes 120A-N for executing the batch jobs. The computing requirements may be predicted based on a historical analysis of running the batch job and based on user requirements. Thus, the resource management server 140A is operable to determine the computing requirements, or the computing needs, of a batch job and an interactive session, and allocate computer resources in one or more data centers managed by the resource management server 140A such that the batch job and the interactive session are executed concurrently. In addition, the grid super scheduler 110 is also operable to send requests for batch jobs and interactive sessions to different resource management servers, such as resource management servers 140A and 140 X. In this example, the computing requirements for the batch jobs and the interactive sessions are determined by different resource management servers 140A and 140X. Also, computing resources from different data centers are allocated. For example, if the resource management server 140A receives the batch requests, computing resources managed by the resource management server 140A are allocated for the batch jobs. If the resource management server 140X receives the interactive session requests, computing resources managed by the resource management server 140X are allocated for the interactive sessions.

One example of an admission criterion for the admission of a batch job is a requirement that the CPU utilization available for the batch job meets a minimum threshold. The minimum threshold value may, for instance, correspond to a 35% CPU utilization for executing the batch job on a 2 GHz local computer. The minimum threshold value may also include any other percentage of CPU utilization. The minimum threshold value required for admission of the batch job may be determined through any suitable application profiling techniques. Other admission criteria may also be evaluated for the admission of a batch job.

As described above, a remote desktop session may be requested and established by the system 100 shown in FIG. 1. According to one embodiment, a mechanism is provided to model the performance requirements of a remote desktop session for allocating sufficient resources to provide support for QoS/SLO guarantees during resource allocation. The remote desktop session performance model may depend upon the interplay of multiple applications, as well as the execution order of multiple applications. In this embodiment, a remote desktop session performance model is generated for each remote desktop session request based on the one or more applications to be executed during the session. Predetermined application performance models are stored and used in the remote desktop session performance model for each application to be executed to determine the resources to be allocated for the session. Using the remote desktop session performance model allows for maintaining high system utilization without over provisioning.

Figure 2:
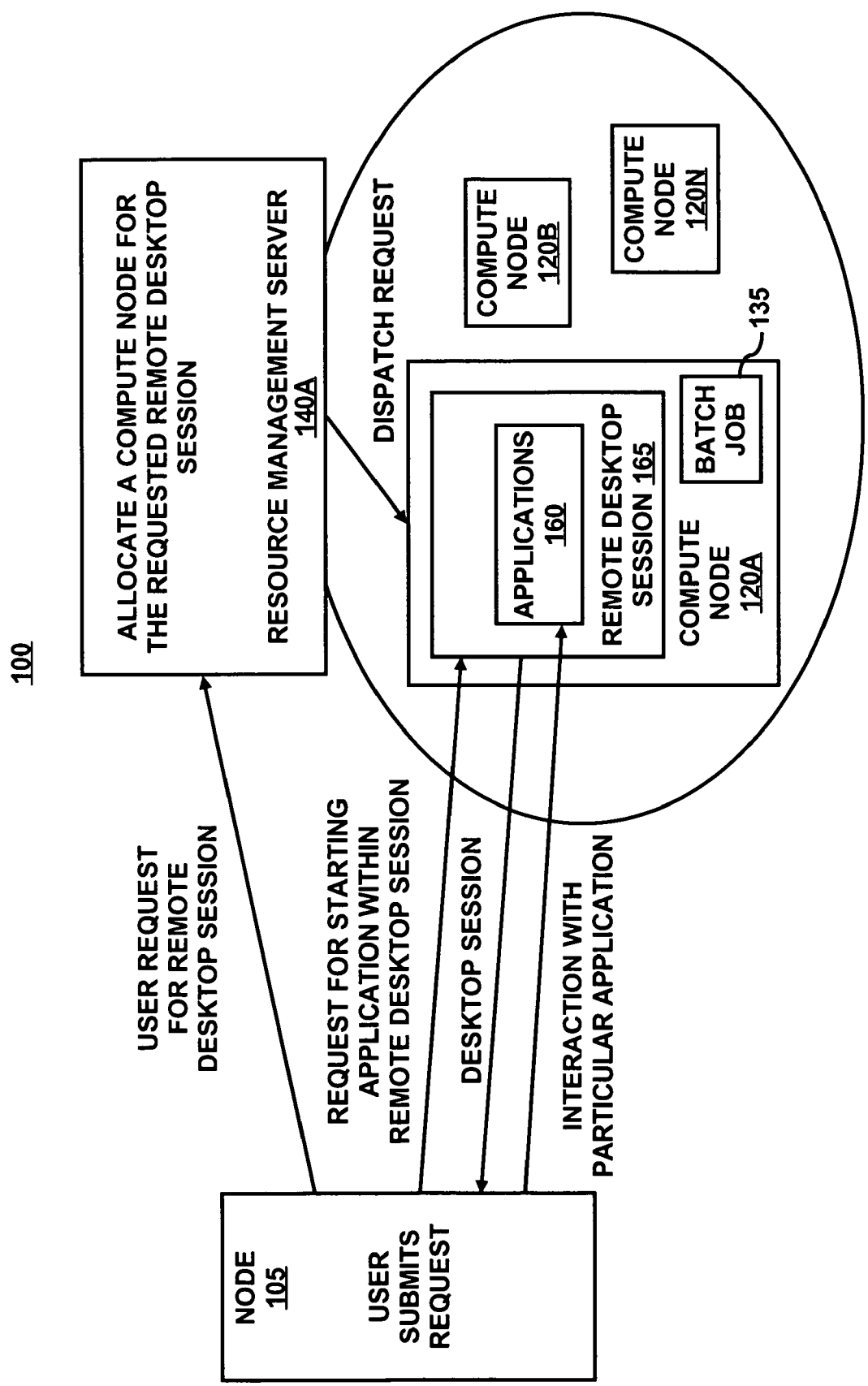
FIG. 2 depicts a system for allocating computer resources, according to an embodiment.

FIG. 2 illustrates an example of submitting a request for a remote desktop session in the system 100. In the example shown in FIG. 2, the request is submitted directly to the site 115A, which includes the resource management server 140A allocating resources, such as a portion of the compute node 120A for the remote desktop session. For example, the compute nodes 120A-N may include blade servers where a portion of the CPUs, memory, and other resources in a blade server may be allocated for a session.

FIG. 2 shows the hierarchal flow diagram of the sequence of steps executed in the system 100. At the top level, the user submits a request, for example, from the node 105, for a remote desktop session to the resource management server 140A. The resource management server 140A, for example, allocates a fraction of a blade server's resources, such as a fraction of the compute node 120A, for the user's request for a remote desktop session 165. A request to start the remote desktop session is then dispatched to the allocated blade server. Once the session is started, the user interactively starts applications 160 through the established remote desktop session connection. This is shown as middle level requests in FIG. 2, such as a request for starting an application within the remote desktop session 165 and desktop session data sent to the node 105. These middle level requests go through the session admission control module 125, shown in FIG. 1, at the compute node 120A.

Once the applications 160 are started, the user interacts with the applications 160 via the remote desktop connection. The interaction between the user and the remote desktop session 165 may be controlled through one or more of a shell, a controlled desktop, and one or more management agents. The controlled shell, desktop, and management agents may be utilized to monitor the interaction with the applications 160, and may be driven through one or more authorization policies, for instance, one or more access control lists.

Authorization policies may be utilized, for example, to specify one or more of an allowed list of executables, files, network interfaces, and IP addresses for a particular global session. Assignment of the desktop session, as described above with reference to FIG. 1, may also be subject to CPU and network bandwidth requirements for the session.

The user interaction with the applications 160 is the lower level of requests in the hierarchy. Thus, a hierarchical request structure is provided in the system 100 including top level requests, middle level requests, and application specific workload requests, as illustrated in FIG. 2.

As further shown in FIG. 2, one or more batch jobs, such as the batch job 135, may be executed simultaneously with one or more applications launched during an interactive session, such as the applications 160, on the same compute node, for example, the compute node 120A. One or more criteria may be utilized in determining which compute node 120A-N, to assign the batch job 135. For example, determining where to assign the batch job 135 may require an evaluation of available computer resources at each compute node 120A-N. For example, an evaluation may be performed of at least one of required CPU, unutilized CPU, processor type, processor speed, and memory requirements of each compute node 120A-N.

Figure 3:
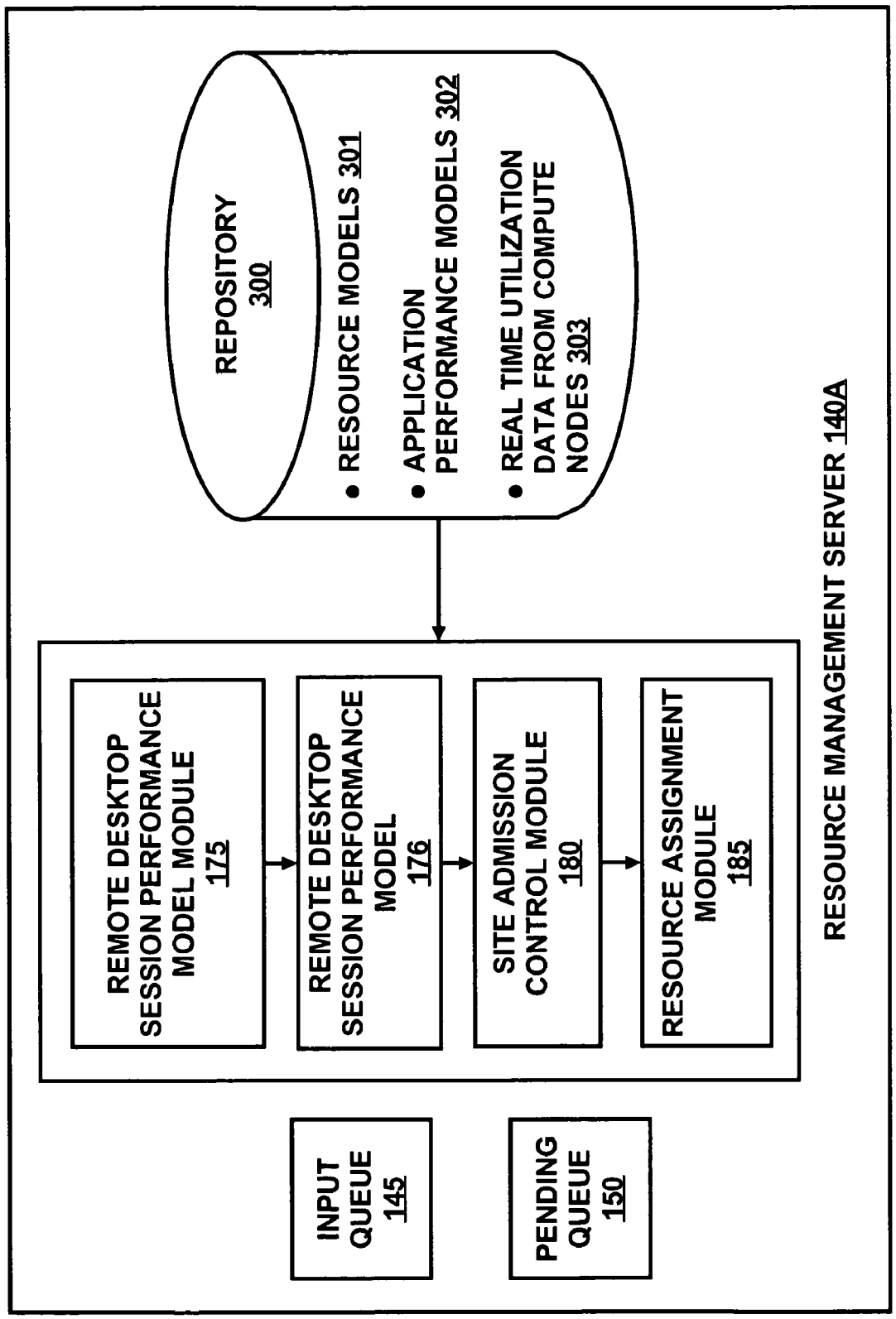
FIG. 3 depicts a resource management server, according to an embodiment.

Referring to FIG. 3, further detail is shown and described with regard to the architecture of the resource management server 140A. As described in detail with reference to FIG. 1, the resource management server 140A may include an input queue 145, a pending queue 150, a site admission control module 180, and a resource assignment module 185. In addition, the resource management server 140A may include a remote desktop session performance model module 175 operable to generate a remote desktop session performance model 176. In one embodiment, the remote desktop session performance model module 175 generates a remote desktop session performance model for each request for a remote desktop session. In another embodiment, for at least some requests for remote desktop sessions, previously generated remote desktop session performance models may be used to model resource requirements, for example, if the requested remote desktop session is similar to a previously requested remote desktop session. The remote desktop session performance models may be stored in the repository 300. The repository 300, for example, stores resource models 301 for the resources at the site 115A, application performance models 301, which may be predetermined for each application, and real time utilization data 303. The utilization data 303, for example, is for the compute nodes 120A-N at the site 115A and may be used to determine whether resources are available for a desktop session and current utilization.

When requests for desktop sessions are first received, the requests are placed in the input queue 145. Then, course grain filtering is performed to determine whether static resource requirements for the request can be satisfied by any of the resources. If the static resource requirements can be satisfied by at least one resource, then the requests may be placed in the pending queue 150 if none of the identified resources are currently available to run the remote desktop session, for example, due to current workload.

The requests in the pending queue 150 wait till the release of resources sufficient enough to meet the requests' performance requirements. The resource models 301 capture the static characteristics of the resources, such as the compute nodes 120A-N shown in FIGS. 1 and 2. Examples of the characteristics include server make, maximum CPU utilization, and memory capacity. On selecting a request from the input queue 145, a compute node satisfying the user's preference of static characteristics are obtained through a match of the user's preferences with those in the resource models.

The remote desktop session performance model 176 is generated by the remote desktop session performance model module 175 after a request passes the course-grain filtering and is admitted. The remote desktop session performance model 176 for the requested remote desktop session is generated based on the list of applications desired in that session. This step uses the application performance models 302 from the repository corresponding to the list of applications. The site admission control module 180 and the resource assignment module 185 make their decisions for allocating resources using the model 176 such that the applications for the remote desktop session, such as the applications 160 shown in FIG. 2, are able to perform at an acceptable QoS level.

The remote desktop session performance model 176 may be used to determine the computing requirements for a remote desktop session, such as the remote desktop session 165 shown and described with reference to FIG. 2. The remote desktop session performance model 176 may depend on one or both of the order of execution of the applications 160 running within the remote desktop session 165, shown in FIG. 2, and the number of instances executed of each of the applications 160 during the remote desktop session 165.

The remote desktop session performance model 176 may be constructed based on information from application performance models for the applications 160 to be executed within the remote desktop session 165. For example, the application performance models 302 corresponding to the applications 160 are used to generate the remote desktop session performance model 176.

An application performance model may be used to describe the resource requirements for a specific application, such as to run at an acceptable QoS level. Resource requirements may include, for example, one or more of CPU utilization, network bandwidth, storage bandwidth, and network latency that are desired by a user, or needed for QoS requirements.

Application performance models may be constructed offline by a system administrator and stored in the repository 300 for access by the resource management server 140A. In one embodiment, an application performance model may be constructed using one or more application profiles. Application profiling may be performed, for example, by executing an application, such as one of the applications 160 shown in FIG. 2, in isolation on a standard platform and applying a workload to the application. The resource consumption of the application may be continuously monitored, in one example, over an entire period of executing the application. For example, trace data is generated from running the application. Statistical techniques may be applied to analyze the trace data to determine requirements for resource allocation to achieve acceptable execution of the application, such as running the application at an acceptable QoS level. In addition, the behavior of a particular user, or the aggregate behaviors of a number of users, may be modeled during the profiling of the application. For example, different states may be used to capture user interactions with interactive applications. Markov chains may also be used to model probabilistic transitions to better model the behavior of a user, or to model the aggregate behaviors of a number of users. In addition to the resource requirements of the application, the resource consumption of the remote display server may also be evaluated in generating the application performance model.

In some of the examples described herein, an application performance model of an application Ai is mathematically represented as $A_i = \{C_i, N_i, S_i, L_{Ni}, L_{Si}\}$, where $C_i$, $N_i$, $S_i$ represent the desired CPU utilization in cycles/second, desired network bandwidth, and desired storage bandwidth respectively for the application $A_i$. $L_{Ni}$ represents the acceptable network latency, for example, between the user's thin client and the compute node. $L_{Si}$ represents the acceptable storage latency between the compute node and a remote storage node, for example, storing applications for the remote desktop session or data used by the applications. The metrics $C_i$, $N_i$, $S_i$, $L_{Ni}$, $L_{Si}$ are examples of some metrics that may be used for application performance modeling. Other metrics may be used for defining an application performance model and a remote desktop session performance model and for making site admission control and resource assignment decisions.

A remote desktop session performance model describes the resource requirement for a remote desktop session. In one example, for purposes of creating the remote desktop session performance model 176 shown in FIG. 3, the remote desktop session 165 shown in FIG. 2 is viewed as a remote display server and one or more application processes, such as the applications 160. For example, a VNC remote desktop session may include a VNC remote display server and the applications 160 running in the context of the particular VNC desktop session. All the applications 160 share the resources allocated to the remote desktop session 165 that the applications 160 are running in.

A remote desktop session performance model is built using the application performance models of the applications which would execute in its context, such as the application performance models of the models 302 corresponding to the applications 160. For example, this list of applications are obtained from the user's request or inferred based on the user's profile. On obtaining the list of the applications, such as a list of the applications 160, the remote desktop session performance model module 175 retrieves the corresponding application performance models from the repository 300.

The order of execution of the applications 160 may be used for generating the remote desktop session performance model 176 in order to more accurately model the performance requirements of the applications 160. The user's request and/or user's profile may only give the list of applications desired during the session and not the order of execution because it may not be known. For example, the user could interactively start these applications in various possible execution orders at runtime, and the user may further decide at runtime to start several instances of each application. Thus, the execution order of applications and number of instances for each application may not always be predetermined.

If the order of execution and number of instances of each of the applications 160 to be executed in the remote desktop session 165 is known, this information is provided by the user to the remote desktop session performance model module 175 for generating the remote desktop session performance model 176.

If the order of execution and number of instances is not known, a model may be used to estimate that information. In one embodiment, several models are available for estimating the order of execution, and one model is selected for a user's request by a policy decision or is pre-selected based on criteria, and then the remote desktop session performance model module 175 generates the corresponding remote desktop session performance model using the execution order determined by selected model.

The models described below use the following representations: n applications, and $A_i$, where i=1 to n, in a remote desktop session. The remote desktop session performance model is represented as $RemoteDesktop_i = \{C_{desktop}, N_{desktop}, S_{desktop}, L_{Ndesktop}, L_{Sdesktop}\}$. $C_i$, $N_i$, $S_i$ represent the desired CPU utilization in cycles/second, desired network bandwidth, and desired storage bandwidth respectively for the application $A_i$. $L_{Ni}$ represents the acceptable network latency, for example, between the user's thin client and the compute node. $L_{Si}$ represents the acceptable storage latency between the compute node and a remote storage node, for example, storing applications for the remote desktop session or data used by the applications.

One example of a model for the order of execution of the applications in a remote desktop session, such as the applications 160 to be executed in the remote desktop session 165, includes modeling the applications 160 as being executed simultaneously in the remote desktop session 165.

In this case, the aggregate resource requirements for the remote desktop session 165 is modeled as the sum of the individual requirements represented as follows:

$$C_{desktop} = O_C + \sum_{i=1}^{i=n} C_i,$$

$$N_{desktop} = O_N + \sum_{i=1}^{i=n} N_i,$$

$$S_{desktop} = O_S + \sum_{i=1}^{i=n} S_i,$$

where $O_C$, $O_N$ and $O_S$ are the extra overheads that is accounted for due to other processes, such as monitoring software. The latency requirements for the remote desktop session 165 is taken as the minimum of those for the individual application sessions, such as $L_{Ndesktop} = \min_{i=1}^{i=n} L_{Ni}, L_{Sidesktop} = \min_{i=1}^{i=n} L_{Si}.$ Another example, of a model for the order of execution of the applications 160 includes modeling the applications 160 as being executed sequentially, where one application is executed and closed and then the next application is executed.

In this case, the aggregate resource requirements for the remote desktop session is modeled as the maximum of the individual requirements:

$C_{desktop} = O_C + \max_{i=1}^{i=n} C_i,$ $N_{desktop} = O_N + \max_{i=1}^{i=n} N_i,$ $S_{desktop} = O_S + \max_{i=1}^{i=n} S_i.$ The latency requirements for the remote desktop session is taken as the minimum of those for the individual application sessions, such as $L_{Ndesktop} = \min_{i=1}^{i=n} L_{Ni}$, $L_{Sdesktop} = \min_{i=1}^{i=n} L_{Si}.$ Another model is the mixed-case model, where some of the applications 160 are executed simultaneously and some others are executed sequentially. In this model, the resource requirement is either modeled as a value based on history-based prediction between the two extremes of simultaneous execution and sequential execution, or it is negotiated with the user.

Another model is referred to as the unknown profiles of the applications. In this model, the applications 160 are modeled as being executed for the first time, and the resource management server 140A is unaware of the resource requirements. In this model, the resource requirements for the remote desktop session 165 may be modeled assuming worst case requirements, such as requiring the maximum permissible resources on a compute node or the user could specify the requirements. The number of instances of each application to be executed may be provided by the user or estimated.

The site admission control module 180 shown in FIG. 3 uses the remote desktop session control model 176 for determining whether to admit a remote desktop session in response to a request. For example, the site admission control module 180 determines whether a compute node with its current resource utilization values can meet the resource and latency requirements for a given remote desktop session. This determination may be performed for a compute node previously determined to satisfy the static resource requirements for the remote desktop session request during the course grain filtering. This determination may be performed when assigning a resource to run the remote desktop session. The resource assignment heuristics are then applied to those resources that satisfy the admission control test. For example, the site admission control module 180 takes as input the remote desktop performance model 176 for the requested list of applications 160, the compute nodes that satisfy the static resource requirements for the user's request, and the real time resource utilization data 303 for those compute nodes. This criterion for admitting a desktop session may be expressed as follows:

$$P^*(T_C-U_C) \geq 100^*C_{desktop},$$

$$\min((T_N-U_N)^*N_T, 100^*N_E) \geq 100^*N_{desktop},$$

$$\min((T_S-U_S)^*S_T, 100^*S_E) \geq 100^*S_{desktop},$$

$$NL_E \leq L_{Ndesktop}, SL_E \leq L_{Sdesktop}.$$

TABLE 1

| Symbol | Meaning |
| --- | --- |
| $U_C$ | Current CPU percentage utilization |
| $U_N$ | Current network bandwidth percentage utilization |
| $U_S$ | Current storage bandwidth percentage utilization |
| $C_{desktop}$ | Aggregate CPU utilization in cycles/second for the remote desktop session |
| $N_{desktop}$ | Aggregate network bandwidth for the remote desktop session |
| $S_{desktop}$ | Aggregate storage bandwidth for the remote desktop session |
| $L_{Ndesktop}$ | Acceptable network latency for the remote desktop session |
| $L_{Sdesktop}$ | Acceptable storage latency for the remote desktop session |
| P | CPU processor speed |
| $N_T$ | Total network bandwidth for the compute node |
| $S_T$ | Total storage bandwidth for the compute node |
| $N_E$ | Dynamic End-to-end network bandwidth between the compute node and the users' submission node hosting the display (for remote display traffic) |
| $S_E$ | Dynamic End-to-end storage bandwidth between the compute node and the users' submission node hosting the display (for remote display traffic) |
| $NL_E$ | End-to-end network latency between the compute node and the users' submission node hosting the display |
| $SL_E$ | End-to-end storage latency between the compute node and the users' submission node hosting the display |
| $T_C$ | Maximum threshold percentage set for the CPU utilization on the compute node e.g. 80% |
| $T_N$ | Max threshold percentage set for the network utilization on the compute node |
| $T_S$ | Max threshold percentage set for the storage utilization on the compute node |

Table 1 lists the meanings of the variables in the equations described above for determining whether a compute node with its current resource utilization values can meet the resource and latency requirements for a given remote desktop session. In the equations, the expressions on the left side of the comparison operator represent the currently available resources on the compute node, and those on the right side of the comparison operator represent the resource requirement for the remote desktop session. The admission control test thus includes determining whether the currently available resources on the compute node can satisfy the required values for the requested remote desktop session. Satisfying the required values, for example, includes satisfying the performance requirements determined by the remote desktop session performance model 176 modeling the remote desktop session 165. Note that due to the heterogeneity in the hardware platforms, quantities may be normalized before being compared, such as expressing CPU utilization in cycles/second.

The resource assignment module 185 is operable to assign a resource to a remote desktop session, such as one of the compute nodes determined by the site admission control module 180 to pass the admission control test. For example, the resource assignment module 185 takes into consideration the remote desktop session performance model 176, and aims to minimize the wait time for assigning resources to a remote desktop session. Unlike batch job submissions, a user after submitting the request for remote desktop session typically waits for the resources to be allocated. The wait time is dependent on and may be the sum of the wait time in the input queue 145, the wait time of the pending queue 150 waiting for resources to become available, and the processing overhead of the admission control and assignment algorithms. In one example, priorities can be assigned to requests based on the profile of the user.

In one embodiment, the resource assignment module 185 uses a multiple variable best fit algorithm that takes resource requirement heuristics into consideration for resource assignment. Note that at this point that the compute nodes that passed the admission control test are considered. Also, a portion of compute node may be allocated to a remote desktop session. The multiple variable best fit algorithm tries to pack up bins tightly, thus reducing the possible fragmentation. This enables the resource assignment module 185 to assign more sessions onto one compute node and should help in reducing the wait time for the requests in the pending queue 150. The multiple variable best fit algorithm is described in further detail with respect to the description of FIG. 6.

Modeling may also be used to determine the number of instances of each application for a desktop session. In one example, a log-trace analysis on previous remote desktop sessions or regular desktop sessions is performed to estimate the number of instances.

Figure 4:
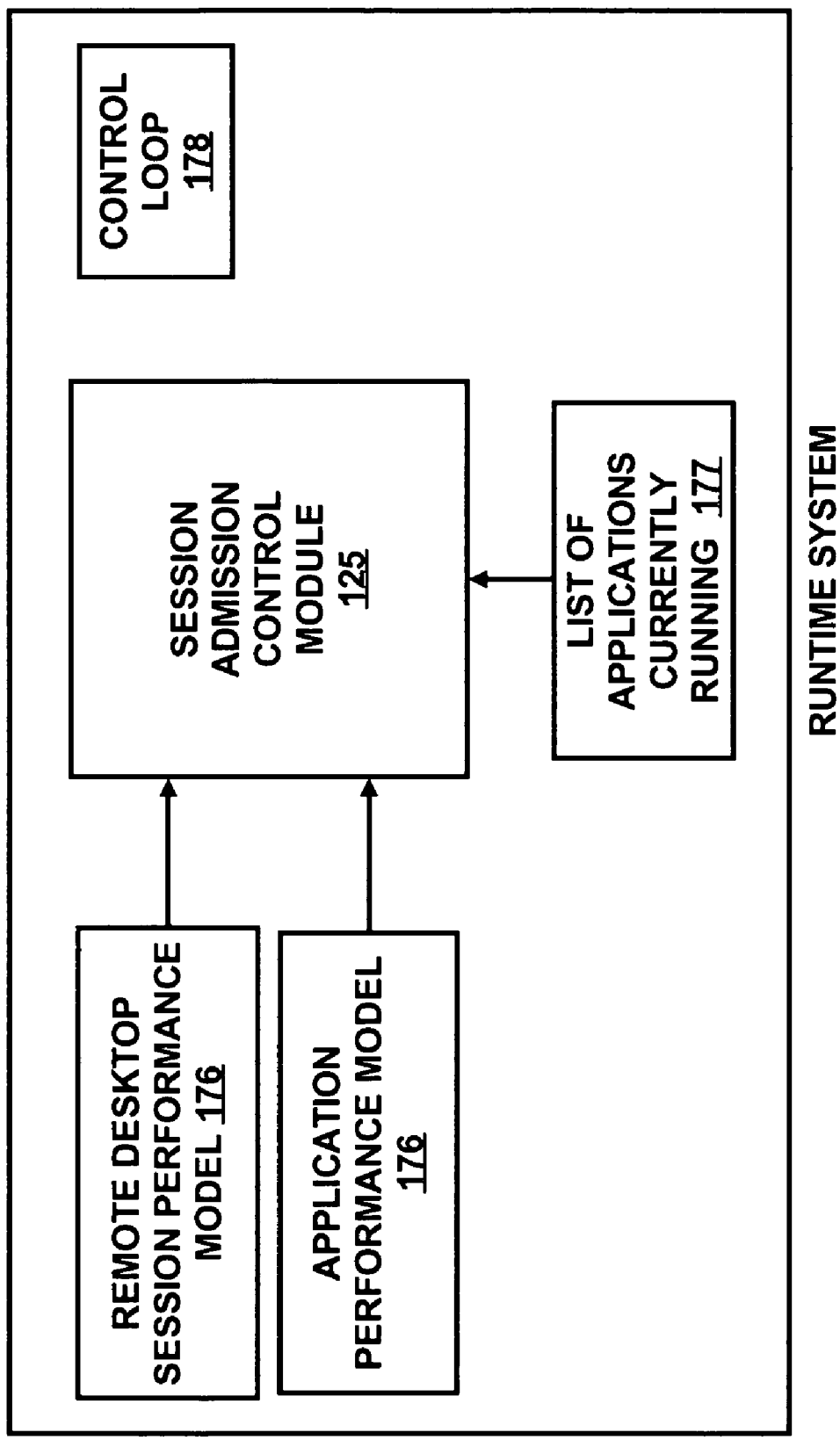
FIG. 4 depicts a runtime system environment, according to an embodiment.

Referring to FIG. 4, an example of a runtime system for the compute node 120A is shown. Once the remote desktop session 165 is started, the session admission control module 125 operates to receive and filter requests from the user for starting new applications within the remote desktop session 165 shown in FIG. 2. For example, the session admission control module 125 includes as input the remote desktop session performance model 176, the application performance models 302 for applications currently running and applications that may be started in the remote desktop session 165, and a list of applications 177 that are currently running in the remote desktop session. Based on this input information, the session admission control module 125 determines whether to admit a request to start a new application in the remote desktop session 165.

The session admission control module 125 may perform admission control during runtime as follows, according to an embodiment. Let $A=\{A_1, A_2, \ldots A_k\}$ be the list of applications 177, such as a list of the current set of applications running in the remote desktop session 165. Let $A_{(k+1)}$ be the application session for which an admission control decision is being made. Then the session admission control decisions are represented as follows:

$$C_{desktop} \geq O_C + \sum_{i=1}^{i=k+1} C_i,$$

-continued $$N_{desktop} \geq O_N + \sum_{i=1}^{i=k+1} N_i,$$

$$S_{desktop} \geq O_S + \sum_{i=1}^{i=k+1} S_i, \text{ and}$$

$$L_{Ndesktop} \leq L_{N(k+1)}, L_{Sdesktop} \leq L_{S(k+1)}.$$

$O_C$, $O_N$, and $O_S$ are the CPU, network, and storage utilization respectively due to other processes, such as monitoring software. The expressions on the left side of the comparison operator in the equations above represent the resource requirements for the remote desktop as captured by the remote desktop session performance models. The expressions on the right side of the comparison operator represent the resource utilization expected by the current set of applications and the requested new application. The admission check is thus to compare that, if the given application is admitted, then the total resources allocated for the remote desktop session can continue to satisfy the resource requirements of all the currently running applications as well as that of the requested application. The session admission control module 125 makes the admission decisions assuming the pre-determined application performance models.

If the execution order and application instances during runtime are always as derived using the remote desktop session application performance model 176, then the session admission control module test would always succeed. However, this may not happen for a variety of reasons, such as a user may execute more instances of an application than estimated or the order of execution may be substantially different than estimated. Then, session admission control may be performed as described above.

The runtime system may also include a control loop 178, such as known in the art, for monitoring utilization of resources by the applications 160, such as the real time utilization data 303 shown in FIG. 3, and take appropriate enforcement actions in case of violations from the consumption expected as per the application performance model. In one embodiment, the control loop 178 and the real time utilization data 303 are not used by the session admission control module 125 to make session admission control decisions for requests to start applications. However, it will be apparent to one of ordinary skill in the art that the control loop 178 and the real time utilization data 303 may be used to session admission control decisions in other embodiments. For example, real time utilization data 303 and the list of applications 177 may be used as input to the session admission control module 125 to determine whether resource capacity may be exceeded if a new application is admitted. Also, batch jobs running on the resource may also be considered when making session admission control decisions. For example, a batch job concurrently running on the resource that is executing the remote desktop session may be included in the list of applications 177.

Figure 5A:
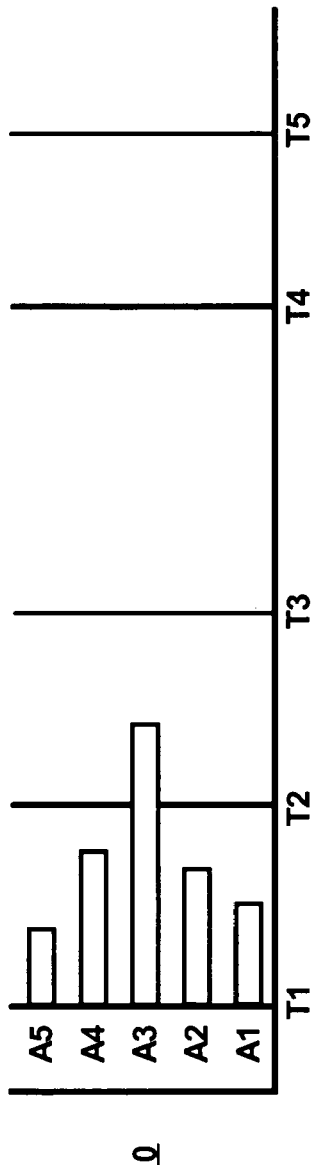
FIG. 5A depicts an example of a simultaneous execution order of applications within an interactive session at a site level, according to an embodiment.

Referring to FIG. 5A, the graph 510 depicts an example of resource requirements for a remote desktop session, such as the remote desktop session 165, in which there is simultaneous execution of five applications (A1-A5) at time interval T1. In the case of simultaneous execution, the aggregate resource requirements for the remote desktop session may be modeled as the sum of the individual resource requirements for each of the applications A1 through A5. One or more batch jobs may be executed simultaneously with one or more interactive sessions on the same compute node or different compute nodes.

Figure 5B:
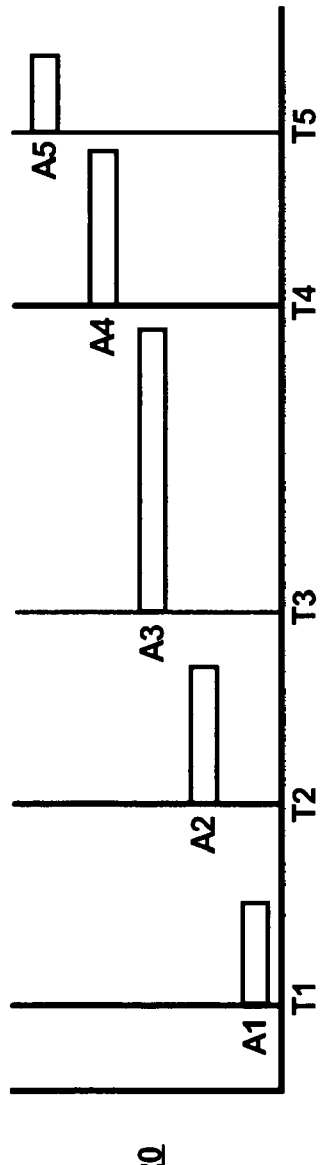
FIG. 5B depicts an example of a sequential execution order of applications within an interactive session at a site level, according to an embodiment.

Referring to FIG. 5B, the graph 520 depicts an example of resource requirements for a remote desktop session, such as the remote desktop session 165, in which there is sequential execution of the five applications (A1-A5). As depicted in graph 520, application A1 is executed at time interval T1, application A2 is executed at time interval T2, and so forth in a sequential manner. In the case of sequential execution of the applications A1 through A5, the aggregate resource requirements for the remote desktop session may be modeled as the maximum of the individual resource requirements for each of the applications A1 through A5. One or more batch jobs may be executed simultaneously with one or more interactive sessions on the same compute node or different compute nodes.

Figure 5C:
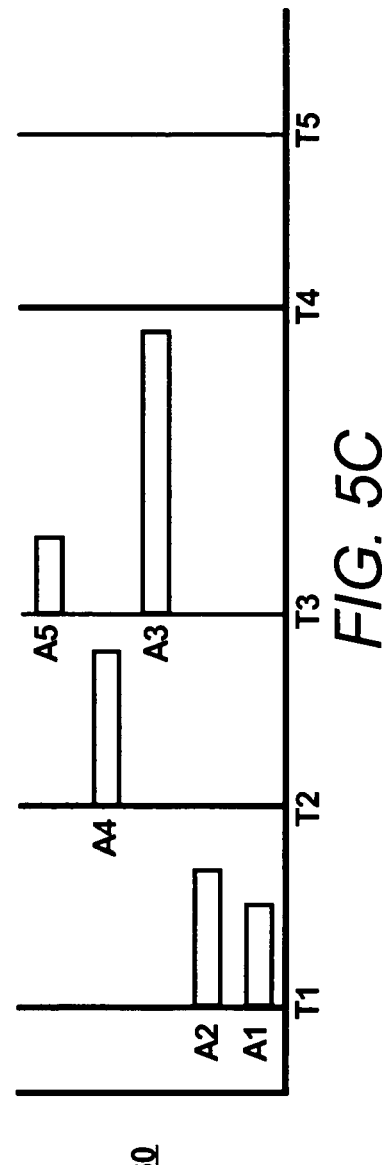
FIG. 5C depicts an example of a mixed execution order of applications within an interactive session at a site level, according to an embodiment.

Referring to FIG. 5C, the graph 530 depicts an example of resource requirements for a remote desktop session, such as the remote desktop session 165, in which there is mixed execution of the five applications (A1-A5). Although the applications A1 through A5 are shown as executing at particular time intervals between T1 through T5, wherein some applications are executed simultaneously, and other applications are executed sequentially, the order of execution of the applications in the case of mixed execution may be varied. In the case of mixed execution, as depicted in the graph 530, the aggregate resource requirements may be modeled, in one example, as a value based on historical-based prediction between the values for simultaneous execution, as in the case of graph 510, and sequential execution, as in the case of graph 520. With mixed-order execution, as in the example shown in graph 530, the aggregate resource requirement may also be negotiated with a user. One or more batch jobs may be executed simultaneously with one or more interactive sessions on the same compute node or different compute nodes.

Figure 6:
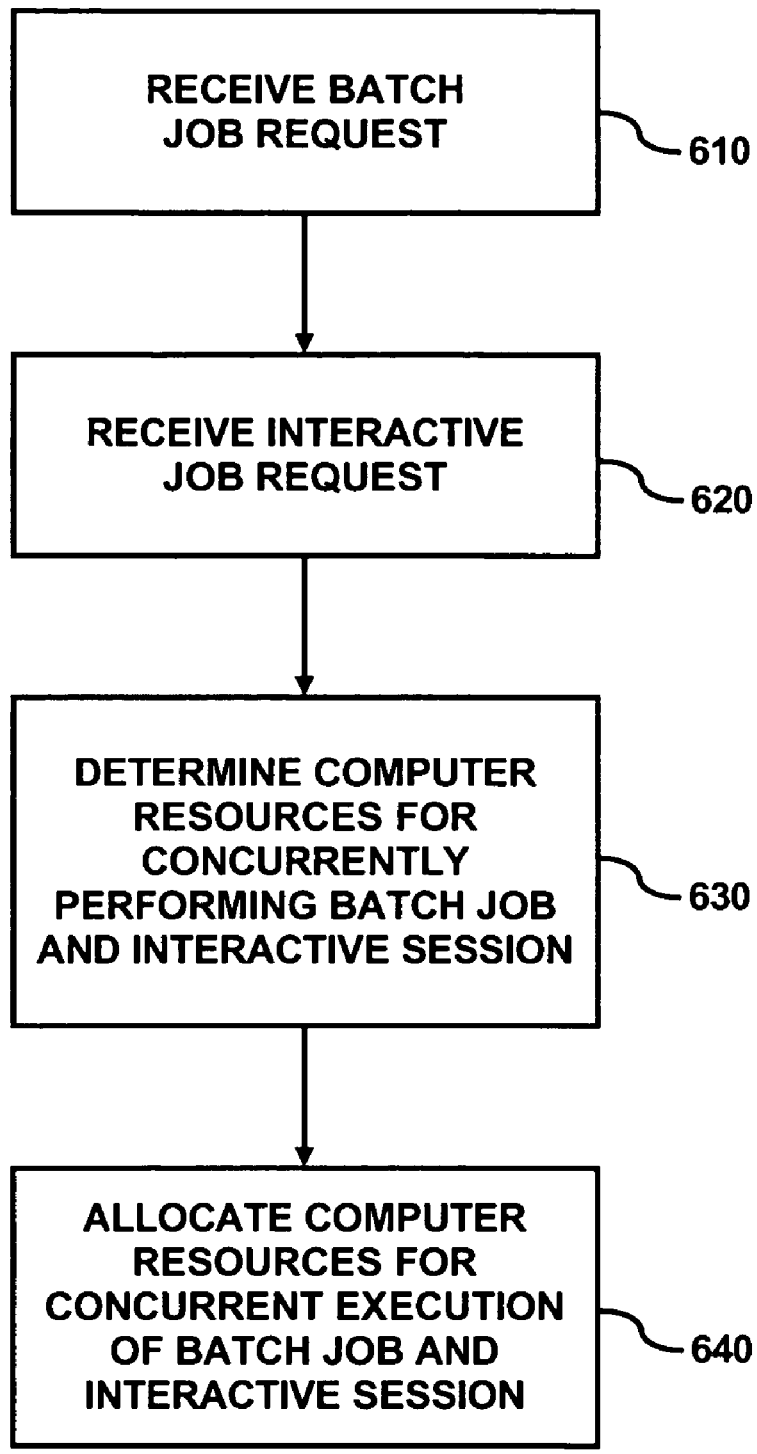
FIG. 6 depicts a flowchart of a method for allocating computer resources, according to an embodiment.

Referring to FIG. 6, a flowchart depicts a method of allocating resources in a grid computing environment. At step 610, a grid computer system 100 may receive at least one request for a batch job. The characteristics of a batch job, such as the batch job 135 shown in FIG. 2, are described above in detail. At step 620, the system may receive at least one request for an interactive session from a user. As discussed above, with reference to FIGS. 1 and 2, a request may be submitted by a user either directly to one of a plurality of sites 115A-115X, or indirectly through a grid super scheduler 110. At step 630, information on resource requirements and resource utilization are used in determining the computer resources required for concurrently executing the at least one batch job and the at least one interactive session.

At step 640, the system 100 may be utilized in allocating the grid computer resources required for concurrently executing at least one batch job and the at least one interactive session. Allocating computer resources includes matching available computer resources with the computer resource requirements determined at step 630. An available computer resource includes a computer resource that can execute, for example, a batch job or an interactive session, when needed. This may be a computer resource currently not being used or a computer resource that is known to soon become available. In one embodiment, one pool of resources may be allocated for an interactive remote desktop session, and a separate pool of resources may be allocated for a batch job. In another embodiment, the same pool of resources may be allocated for concurrently executing a batch job and an interactive session on the same machine. Grid computer resources may thus be allocated to satisfy the computing needs, or computing requirements, for concurrently executing a batch job and an interactive session. In addition, allocation of computer resources may utilize a least loaded algorithm for determining allocation of resources for executing a batch job.

A multiple variable best fit algorithm may be utilized for determining allocation of grid computer resources for executing one or more remote desktop sessions 165. Multiple variables, such as network bandwidth and storage bandwidth, may be considered by the multiple variable best fit algorithm for determining resource allocation. The multiple variable best fit algorithm may also take other resource requirement heuristics into consideration for resource assignment. The compute nodes 120A-120N satisfying the resource requirements are considered for resource assignment. Resource assignment may also include simultaneous allocation of multiple remote desktop sessions 165 on a single compute node, such as the compute node 120A.

In allocating grid computer resources for executing a remote desktop session 165, the multiple variable best fit algorithm may assign the remote desktop session 165 to the compute nodes 120A-120N in a manner that reduces fragmentation. By reducing or minimizing fragmentation, the multiple variable best fit algorithm may be used to assign a greater number of remote desktop sessions, including the remote desktop session 165, to the compute nodes 120A-120N and thus reduce the wait time for requests in the pending queue 150.

The multiple variable best fit algorithm may also perform weighted best fitting in determining resource allocation for executing the remote desktop session 165. In one example, a user may submit a request for running the remote desktop session 165. For each compute node 120A-120N that satisfies the resource requirements for the user's request, the multiple variable best fit algorithm determines the available resources, including the available CPU, network bandwidth and storage bandwidth. The multiple variable best fit algorithm also determines the difference, or delta value, between the available resources of each compute node 120A-120N and the required resources for executing the user's requested remote desktop session.

After determining each delta value, the multiple variable best fit algorithm may assign a weight function for each resource, including the CPU, network bandwidth and storage bandwidth, for each compute node. Each weight function may be assigned in a manner that is inversely proportional to the corresponding delta value. For instance, the weight function assigned for the CPU resource for the compute node 120A may be inversely proportional to the delta value for the CPU resource for the compute node 120A. Based on the assigned weight functions for each resource, the multiple variable best fit algorithm may then aggregate each of the assigned weight functions for each of the compute nodes 120A-120N. The compute node 120A-120N having the highest aggregate weight function may be selected for executing the user's requested remote desktop session. In a case in which more than one compute node 120A-120N has the same aggregate weight function, the compute node 120A-120N with the least load may be selected for executing the session, where load is measured in terms of CPU utilization. The multiple variable best fit algorithm may also utilize information obtained from the remote desktop session performance model 176 in determining grid computer resource allocation.

In determining grid computer resource allocation, one or more of the resources may be considered bottleneck resource variables. The weight assignments may be adjusted by the multiple variable best fit algorithm to account for the bottleneck resource variables. For instance, for a computer-aided design (CAD) session, the CPU requirement may be considered the bottleneck resource variable. Thus, to allocate resources for the CAD session, the multiple variable best fit algorithm may assign a greater weight to the CPU utilization. In another example, in the case of computer applications for performing financial transactions, storage bandwidth may be considered the bottleneck resource variable. For office applications, network latency may be considered the bottleneck resource variable. In each case, the multiple variable best fit algorithm may adjust one or more weight assignments in determining resource allocation for executing a particular type of application.

Figure 7:
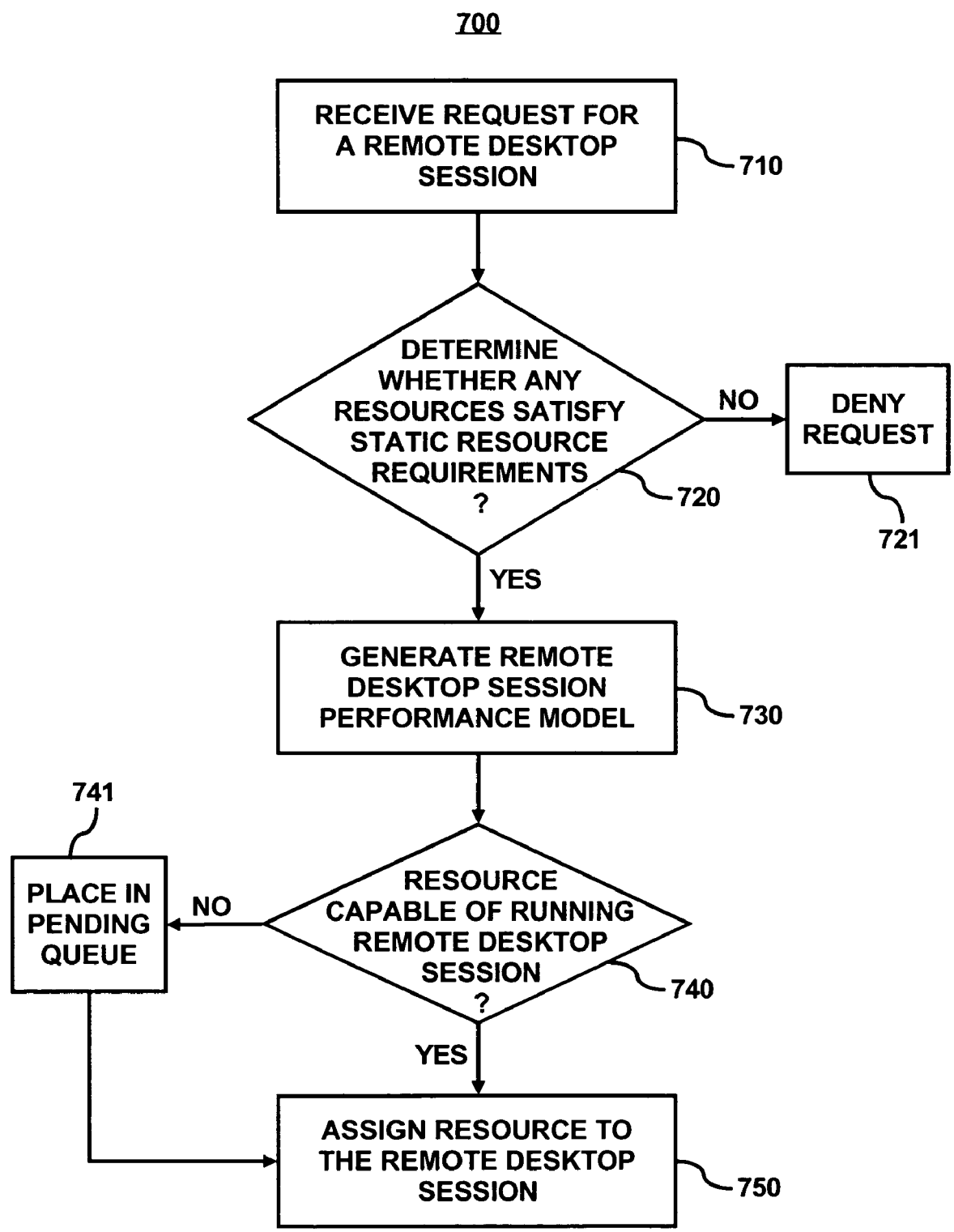
FIG. 7 depicts a flowchart of a method for allocating computer resources, according to an embodiment.

FIG. 7 illustrates a flowchart of a method 700 for assigning at least one resource to a remote desktop session, according to an embodiment. The method 700 is described with respect to systems shown in FIGS. 1-5 by way of example and not limitation. The method 700 may be used in other systems.

At step 710, the resource management server 140A shown in FIG. 1 receives a request for a remote desktop session.

At step 720, a determination is made as to whether any resources 120A . . . N satisfy the static resource requirements for the request. For example, course grain filtering is performed to determine whether any resources 120A . . . N satisfy the static resource requirements for the request. If at least one resource does not satisfy the static resource requirements, the request is denied at step 731.

At step 730, if at least one resource of the resources 120A . . . N satisfies the static resource requirements, the remote desktop session performance model module 175, shown in FIG. 3, generates the remote desktop performance model 176 based on the applications 160 to be used in the remote desktop session 165, shown in FIG. 2.

At step 740, the site admission control module 180 shown in FIG. 3 determines whether a resource identified at step 720 is capable of running the remote desktop session based on the computing requirements for the requested remote desktop session, which are estimated using the remote desk session performance model. For example, a resource may be currently running a batch job or other session and may not be able to run the new remote desktop session until the batch job or other session is completed. If a resource is not capable, at step 741, the site admission control module 180 places the request in the pending queue 150 from the input queue 145 until a resource is available to run the remote desktop session.

If a resource is available to run the remote desktop session, the resource assignment module 185 assigns the resource to the remote desktop session at step 750. For example, the resource assignment module 185, shown in FIG. 3, assigns at least one resource to the remote desktop session 165 using the remote desktop session performance model 176. The at least one resource, for example, is a compute node or a portion of a compute node. An example of a compute node is a server and an example of a portion of a compute node is a percentage of the CPUs, memory and other resources on the server that may be allocated for running an application. In some instance several resources may become available that are operable to run the remote desktop session. For example, at steps 710 and 720 a set of resources may be identified that are each operable to run the remote desktop session. If several of those resources become available, then at step 750, one of those resources is assigned to run the remote desktop session. If more than one of the available resources is needed to run the remote desktop session, then those resources are assigned.

Figure 8:
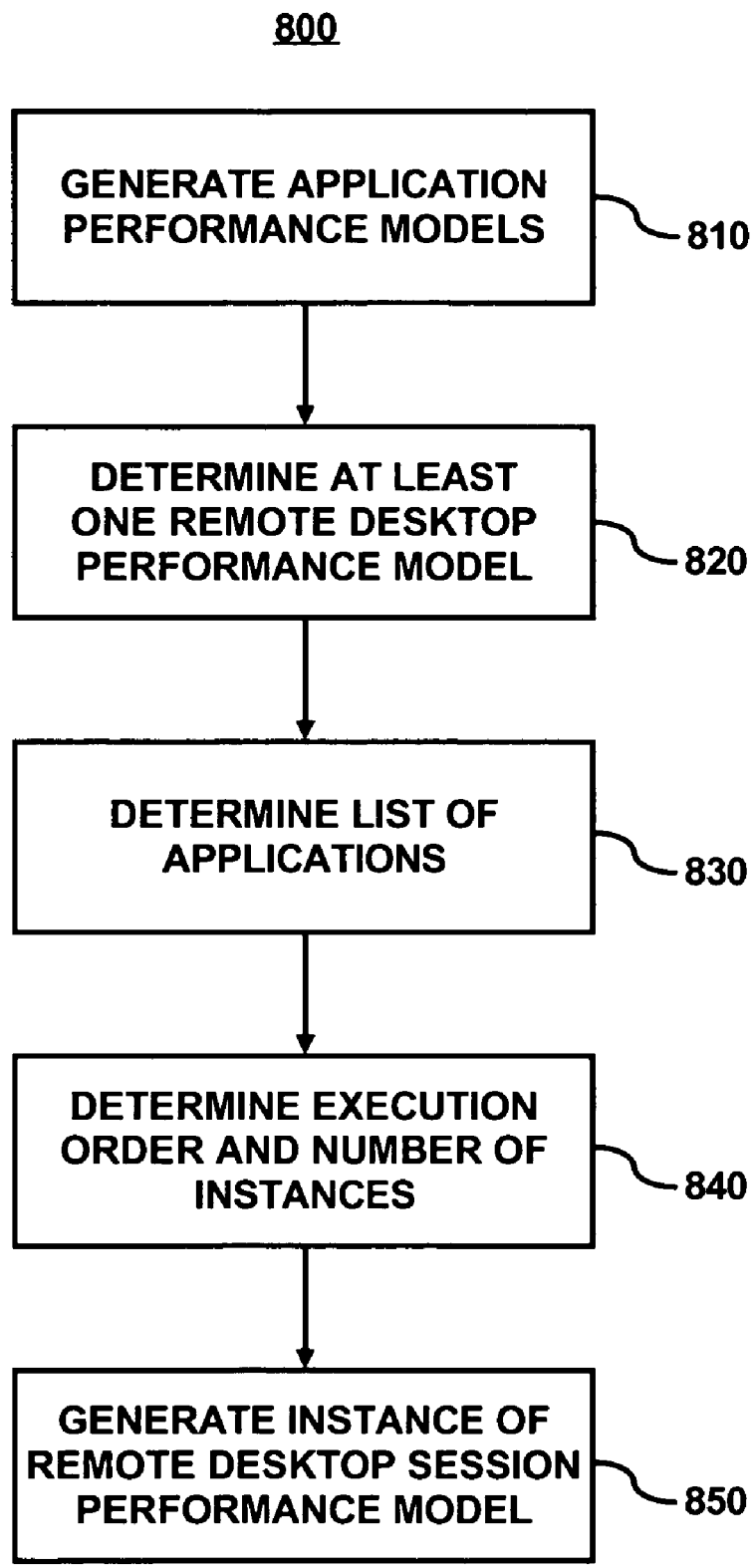
FIG. 8 depicts a flowchart of another method, according to an embodiment.

FIG. 8 illustrates a method 800 according to another embodiment. The method 800 is described with respect to systems shown in FIGS. 1-5 by way of example and not limitation. The method 800 may be used in other systems.

At step 810, application performance models 302, shown in FIG. 3 are generated. At step 820, at least one model to be used to determine the remote desktop session performance model 176, shown in FIG. 3, is determined. For example, such as described above, the remote desktop session performance model is represented as RemoteDesktop$_i$={$C_{desktop}$, $N_{desktop}$, $S_{desktop}$, $L_{Ndesktop}$, $L_{Sdesktop}$}. Also, a model for determining the order of execution may be determined. Steps 810 and 820 may be performed prior to receiving requests for remote desktop sessions. In one embodiment, at least one of the model to be used for the remote desktop session performance model and the model to be used for determining the order of execution is selected from predetermined models in step 820.

At step 830, a list of application to be executed in the remote desktop session is determined. For example, a user supplies the list. At step 840, the execution order of the applications and the number of instances of each application is determined, for example, using one of the models described above. At step 840, the application performance models corresponding to the applications to be executed in the remote desktop session are retrieved.

At step 850, an instance of the remote desktop session performance model 176 is generated by substituting determined values for parameters in the model selected at step 820 to be used for determining the remote desktop session performance model. For example, values for $C_{desktop}$, $N_{desktop}$, $S_{desktop}$, $L_{Ndesktop}$, $L_{Sdesktop}$ are determined and substituted in the model. This instance of the remote desktop session performance model is used, for example, to determine whether a resource, based on its current utilization, has sufficient capacity to be assigned a remote desktop session and to determine whether to start new applications in a running remote desktop session.

Figure 9:
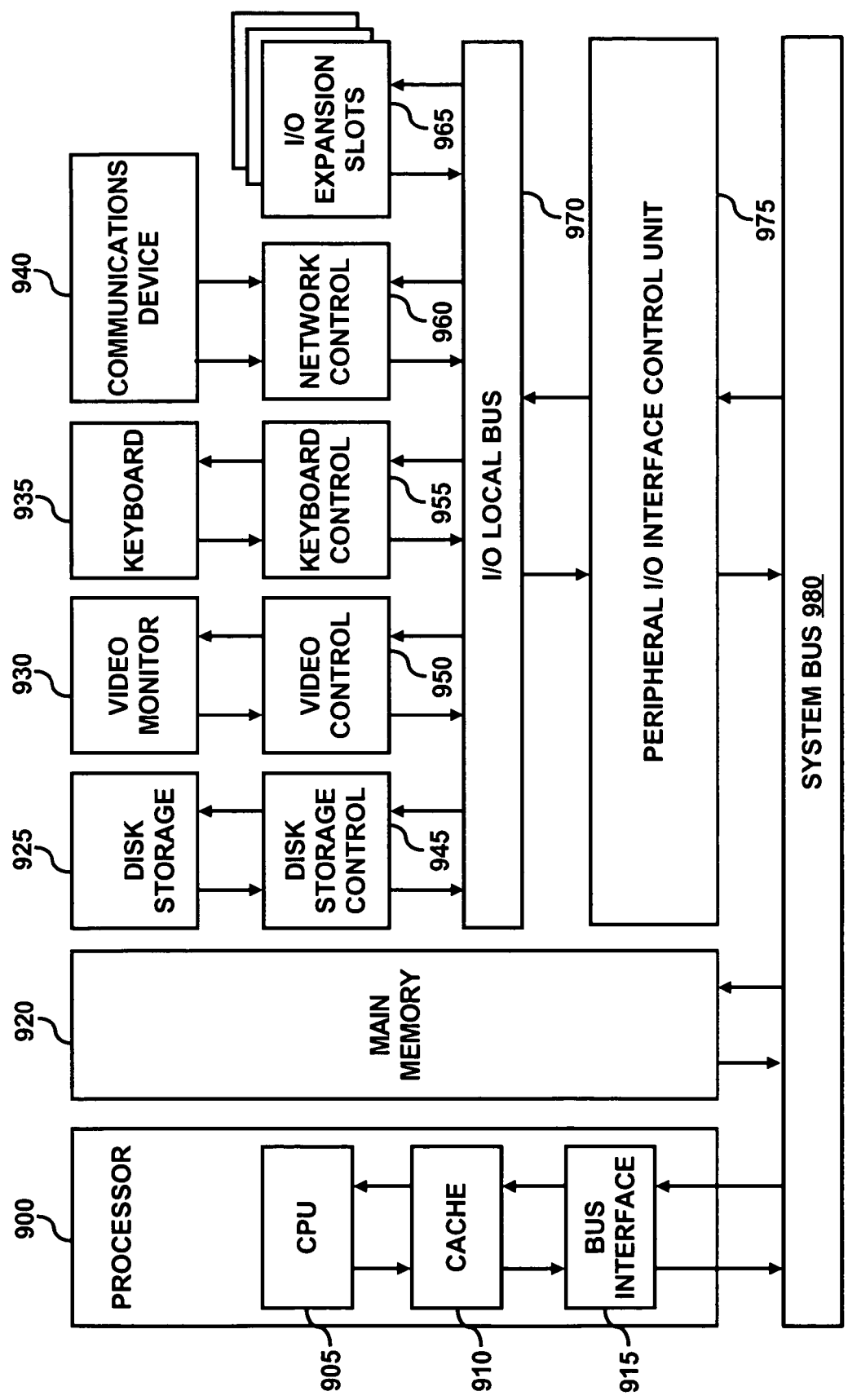
FIG. 9 depicts an example of a computer system which may be used in one or more of the embodiments.

Referring to FIG. 9, a block diagram of an example architecture is shown for a general purpose computer suitable for executing the functions of one or more components of the system 100 shown in FIGS. 1-4. The illustrated general purpose computer may also be suitable for running other network applications. At least one microprocessor 900, including a central processing unit (CPU) 905, a memory cache 910, and a bus interface 915, is operatively coupled via a system bus 980 to a main memory 920 and an Input/Output (I/O) control unit 975. The I/O interface control unit 975 is operatively coupled via an I/O local bus 970 to a disk storage controller 945, a video controller 950, a keyboard controller 955, a network controller 960, and I/O expansion slots 965.

The disk storage controller 945 is operatively coupled to the disk storage device 925. The video controller is operatively coupled to the video monitor 930. The keyboard controller 955 is operatively coupled to the keyboard 935. The network controller 960 is operatively coupled to the communications device 940. The communications device 940 is adapted to allow the network inventory adapter operating on the general purpose computer to communicate with a communications network, such as the Internet, a Local Area Network (LAN), a Wide Area Network (WAN), a virtual private network, or a middleware bus, or with other software objects over the communications network.

Computer program instructions for implementing one or more of the steps described in the methods 600-800 and other steps described herein may be stored on the disk storage device 925 until the processor 900 retrieves the computer program instructions, either in full or in part, and stores them in the main memory 920. The processor 900 then executes the computer program instructions stored in the main memory 920. The program instructions may be executed with a multiprocessor computer having more than one processor.

The general purpose computer illustrated in FIG. 9 is an example of a device suitable for executing the various functions of the system 100. The system 100, and any other associated programs, applications, components, and operations, may also run on a plurality of computers, a network server, or other suitable computers and devices.

One or more of the steps described in the methods 600-800 and other steps described herein may be implemented as software stored on a computer readable medium, such as the disk storage device 925 or the main memory 920, and executed by a processor, such as the processor 900. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

What has been described and illustrated herein are embodiments along with some variations. While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method comprising:
   receiving a request for a remote desk-top session;
   generating, by a processor a remote desktop session performance model based on applications to be used in the remote desktop session wherein the remote desktop session performance model is used to estimate the resource requirements for running the applications in the remote desktop session while maintaining a predetermined QoS; and
   assigning at least one resource to run the remote desk-top session using the remote desktop session performance model.

2. The method of claim 1, wherein generating a remote desktop session performance model based on applications to be used in the remote desktop session further comprises:
   retrieving an application performance model for each of the applications;
   determining an order of execution for the applications; and determining the remote desktop session performance model based on the application performance model for each application and the order of execution.

3. The method of claim 2, wherein determining an order of execution for the applications further comprises:
determining a model for estimating the order of execution for the applications.

4. The method of claim 3, wherein determining a model for estimating the order of execution for the applications further comprises:
selecting one of a plurality of models operable to estimate the order of execution.

5. The method of claim 3, wherein the model for estimating the order of execution models the applications as being executed simultaneously.

6. The method of claim 3, wherein the model for estimating the order of execution models the applications as being executed sequentially.

7. The method of claim 3, wherein the model for estimating the order of execution models some of the applications as being executed simultaneously and some of the applications as being executed sequentially.

8. The method of claim 3, wherein the model for estimating the order of execution models the applications as requiring a maximum utilization of resources for a compute node.

9. The method of claim 2, wherein determining the remote desktop session performance model further comprises:
determining a number of instances to be executed during the remote desktop session for each application; and
determining the remote desktop session performance model based on the number of instances to be executed for each application.

10. The method of claim 2, wherein determining an order of execution for the applications further comprises:
receiving the order of execution from a user.

11. The method of claim 1, further comprising:
determining static resource requirements for at least one resource for running the remote desktop session; and
determining whether at least one resource at a site satisfies the static resource requirements;
denying the request in response to no resources at the site satisfying the request; and
the assigning further comprises assigning the at least one resource determined to satisfy the static resource requirements to run the remote desktop session in response to determining the at least one resource satisfies the static resource requirements.

12. The method of claim 11, further comprising:
placing the request in a pending queue in response to the at least one resource being currently unavailable to run the remote desktop session.

13. The method of claim 1, further comprising:
simultaneously running the remote desktop session and a batch job on the at least one resource.

14. A resource management system, comprising:
a processor;
a remote desktop session performance model module operable to generate, by the processor, a remote desktop session performance model for estimating resources needed to run an interactive remote desktop session while maintaining a predetermined QoS;
a site admission control module operable to determine whether at least one resource satisfies resource requirements for the interactive remote desktop session based on the remote desktop session performance model; and
a resource assignment module operable to assign the at least one resource to the interactive remote desktop session, wherein the at least one resource satisfies the resource requirements for the interactive remote desktop session.

15. The resource management apparatus of claim 14, wherein the remote desktop session performance model module is operable to use application performance models for applications to be run in the interactive remote desktop session to generate the remote desktop session performance model.

16. The resource management apparatus of claim 15, wherein the application performance models are determined from trace data for the applications.

17. The resource management apparatus of claim 15, wherein the remote desktop session performance model module is operable to estimate an order of execution of the applications for generating the remote desktop session performance model.

18. The resource management apparatus of claim 14, further comprising:
a session admission control module for determining whether to start an application in the interactive remote desktop session based on the remote desktop session performance model.

19. The resource management apparatus of claim 18, further comprising:
a monitoring system operable to monitor the utilization of the allocated at least one resource.

20. The resource management apparatus of claim 14, wherein the site admission control module is operable to match resource models of resources at the site with static resource requirements from a user for running the interactive remote desktop session.

21. An apparatus comprising:
means for generating a remote desktop session performance model for each of a plurality of requests for remote desktop sessions;
means for determining whether at least one resource satisfies resource requirements for a requested remote desktop session;
means for assigning the at least one resource to the requested remote desktop session; and
means for determining whether to grant a request to start an application in the remote desktop session using the remote desktop performance model, wherein the remote desktop session performance model is used to estimate the resource requirements for running the application in the remote desktop session while maintaining a predetermined QoS.

22. A non-transitory computer readable storage medium upon which is stored a computer program including instructions which when executed by a processor cause the processor to perform the following comprising:
determining applications to be executed in a requested remote desktop session;
retrieving application performance models for the applications;
generating a remote desktop session performance model based on the application performance models; wherein the remote desktop session performance model is used to estimate the resource requirements for running the applications in the remote desktop session while maintaining a predetermined QoS; and
selecting at least one resource to assign to the requested remote desktop session using the remote desktop session performance model.

* * * * *

UNITED STATES PATENT AND TRADEMARK OFFICE
CERTIFICATE OF CORRECTION

| | | |
|---|---|---|
| PATENT NO. | : 7,870,256 B2 | Page 1 of 1 |
| APPLICATION NO. | : 11/248932 | |
| DATED | : January 11, 2011 | |
| INVENTOR(S) | : Vanish Talwar et al. | |

It is certified that error appears in the above-identified patent and that said Letters Patent is hereby corrected as shown below:

In column 20, Claim 1, line 51, delete "desk-top" and insert -- desktop --, therefor.

In column 20, Claim 1, line 59, delete "desk-top" and insert -- desktop --, therefor.

Signed and Sealed this
Twenty-sixth Day of April, 2011

David J. Kappos
*Director of the United States Patent and Trademark Office*